(No Model.) 3 Sheets—Sheet 1.
W. R. SMITH.
BALL BEARING.
No. 575,382. Patented Jan. 19, 1897.
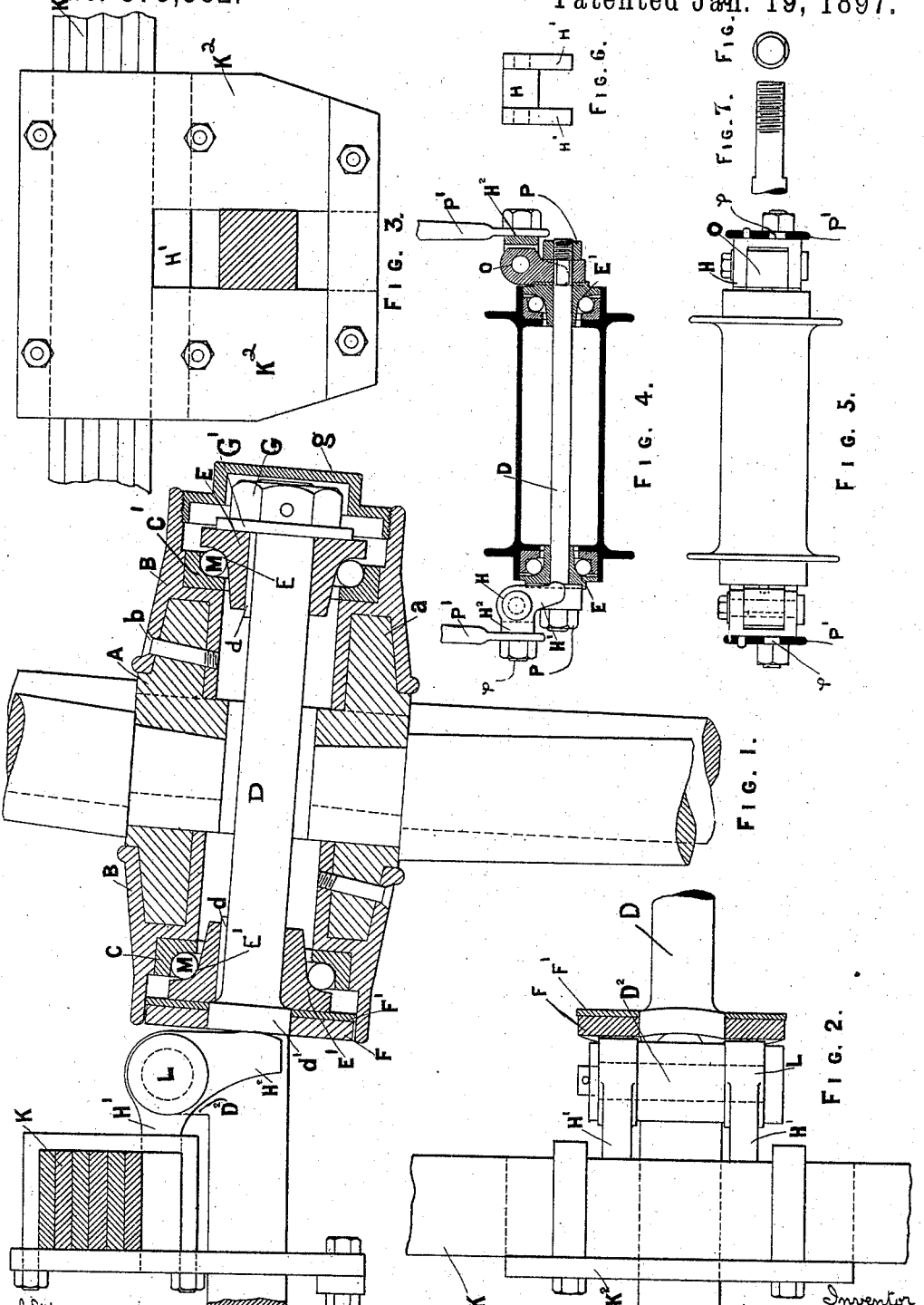

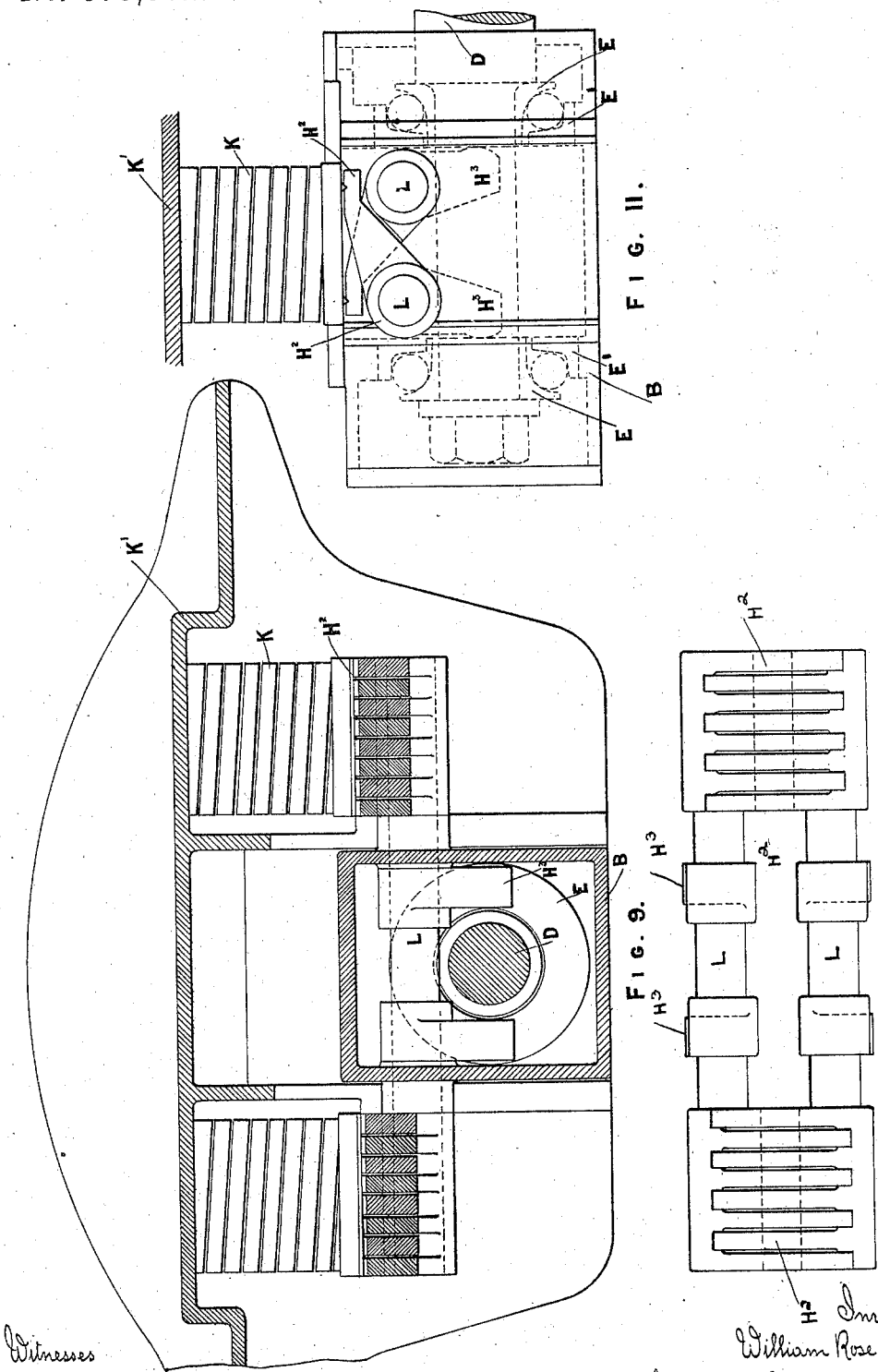

(No Model.) W. R. SMITH. 3 Sheets—Sheet 3.
BALL BEARING.

No. 575,382. Patented Jan. 19, 1897.

Witnesses
H. van Oldenneel
E. A. Scott

Inventor
William Rose Smith
by
Attorneys

UNITED STATES PATENT OFFICE.

WILLIAM ROSE SMITH, OF LONDON, ENGLAND.

BALL-BEARING.

SPECIFICATION forming part of Letters Patent No. 575,382, dated January 19, 1897.

Application filed June 9, 1896. Serial No. 594,811. (No model.)

*To all whom it may concern:*

Be it known that I, WILLIAM ROSE SMITH, civil engineer, a citizen of Great Britain, residing at Laurence Pountney Hill, in the city of London, county of Middlesex, and Kingdom of England, have invented certain new and useful Improvements in Ball-Bearings, of which the following is a specification.

This invention relates to improvements in the construction and arrangement of ball-bearings, the objects being to produce a ball-bearing in which the weight or a part of the weight of the vehicle is automatically caused to press sidewise against the balls and by this transmitted side pressure, varying with the load, to more uniformly distribute the weight of the vehicle over the whole of the balls, and also to dispense with the side or end screw-and-nut-adjustment devices now employed in connection with other ordinary ball-bearings.

Figure 13:
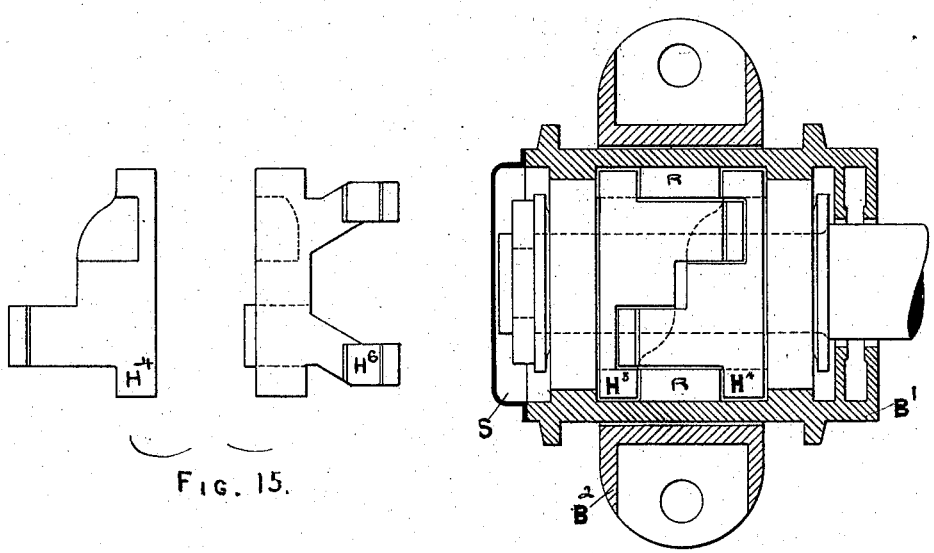
Figure 15:
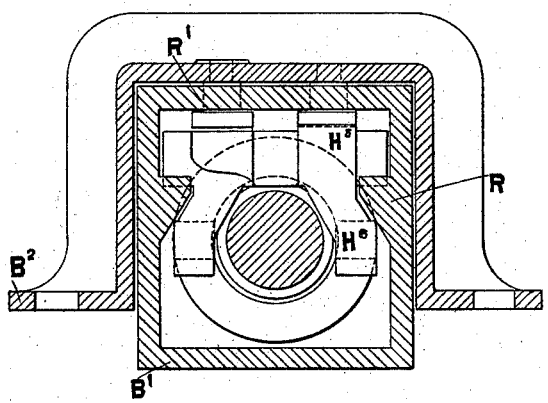
Figures 12, 14:
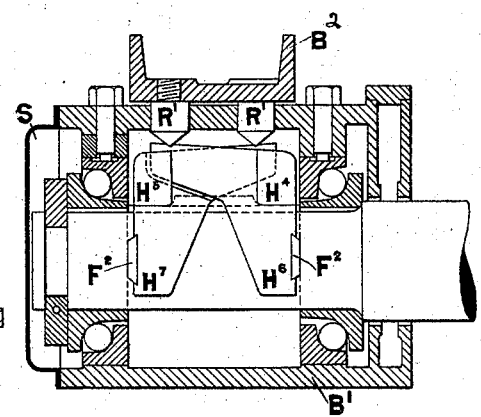

In the three accompanying sheets of explanatory drawings, Figure 1 is a sectional elevation of my improved bearing and fittings applied to an ordinary road-vehicle axle. Fig. 2 is a part plan, and Fig. 3 a part end elevation, of the same. Fig. 4 is a sectional elevation of a cycle pedal or hub arranged with my improved bearings, and Fig. 5 is a plan of the same, Figs. 6, 7, and 8 being elevations of detail parts of the arrangement. Figs. 9, 10, 11, 12, 13, 14, and 15 show illustrations of my improved bearings when applied to an ordinary railway truck or carriage or tramway-car axle.

When applying my improvements to the wheels of ordinary road-vehicles, I bore out the ends $a$ of the nave A, and I then attach a metal or other suitable material casing B to the nave-box by screws $b$ or by any other suitable ordinary means of attachment. I cause concave ball-cups C C' to be fitted into each casing, the concave surfaces facing outward. The axle-journals D are turned parallel and are fitted with feathers or keys $d$ for carrying the concave ball-cones E E' and for enabling such ball-cones to move freely along the journal while revolving with it.

The journal terminates with a shoulder or stop $d'$, against which the inner convex ball-cone E' bears, and onto this ball-cone E' a bearing-plate F is fastened, having a yielding rubber or felt or other buffer-like washer or shock-pad F' placed between it and the cone E'. After the inner ball-cone has been slipped onto the journal the wheel is put on and the inner set of balls inserted, then the outer one is placed in position and the balls inserted, and a nut G, washer or keep G', and cap $g$ is attached for securing all in working position.

The longitudinal springs K of the vehicle are removed from their ordinary positions from the palms attaching them to the axle, and are instead made fast to the palm formed on one arm or arms H' of a two-armed lever H, carried by a pin L or the like upon a socket or bracket D², standing on the axle in place of the original palm. The other arm or arms H², I bend downward nearly vertically, so as to cause them to bear against the bearing-plate F. A vertical draw plate K² is fastened to the side of the spring to take the draft of the vehicle.

The weight of the vehicle is carried upon the springs, from which it is transmitted by the bent levers H' H² to the ball-cones E E', in this manner keeping the parts free from looseness and the load under a pressure varying with the load or weight of the vehicle. By this my improved arrangement the journal with the stops $d'$ on the axle and the outer nuts G $g$ form a safety-bolt, so that in case of the sudden removal of the weight by a jerk upward of one side of the vehicle the balls M do not leave their places, but remain in their respective ball-races.

For wheels of new vehicles the naves may be made of wood or metal, with a similar arrangement of ball-bearings and parts for transmitting the weight of the vehicle, so as to produce a uniform distribution of side pressure upon the ball-bearings.

When applying my invention to cycle or like wheels, I arrange the ball-hub so that the shaft D, Figs. 4 and 5, passes right through the hub and cones and is of uniform diameter. The concave ball-cones E E' are secured to the shaft by feathers, upon which they are free to slide. The extremities of the shaft are screwed as far on as the outer ends of the feathers, and a bracket O, forming the fulcrum for the side-pressure lever H, is screwed or attached to each end and kept in position by a lock-nut P or other ordinary fastening. A bent forked lever H is fastened by a pin on this fulcrum, the lower forked end H' pressing the concave ball-cone inward and the upper or horizontal end H² receiving the lower end of the cycle-framework P', to which it is attached by a pin $p$.

On machines expressly constructed for my improvements the lower end of the cycle-frame may alternatively be attached to the horizontal forked end of the pressure-lever. The back of the lower forked end bears loosely against the fulcrum-bracket to keep the balls in position when the cycle is lifted.

When applying my improvements to a tramway, railway, or other like carriage or bogie in one manner, I fasten the concave ball-cones E to the journal D of the axle, as shown in Figs. 9, 10, and 11. The concave ball-cups E', I fit into the ends of the axle-box B, so that they may slide in a direction parallel with the axle-box. Two or more side-pressure levers H³ are mounted upon a shaft or pins L L, passing through the axle-box, and upon the same pin or shafts L L, I mount other transmitting or receiving pressure-lever arms H² H² outside the axle-boxes for supporting the springs K or casing-frame K' of the vehicle. I attach my buffer or shock-pad to the ends of the levers H² H³ for taking up any sudden blow or jar which the vehicle may be subjected to. The levers cause the weight of the car to press the concave ball-cups E E' outward, thus distributing side pressure uniformly over the ball-bearings.

When arranging my improved side-pressure ball-bearings for working in dust-proof axle-boxes, I modify the arrangements hereinbefore described and mount the working or moving parts in one self-contained case or box B', as shown in Figs. 12, 13, 14, and 15. The side-pressure levers H⁴ H⁵, I carry upon bearings or supports R, formed upon or attached to the axle-box B'. The strap-bracket B² is carried by knife-edges R', resting on the levers H⁴ H⁵, and I cause the load to be transmitted from the pivot or bearing ends H⁴ H⁵ to the side-pressing ends H⁶ H⁷, and I introduce my buffer-pads F², as hereinbefore described, for taking up the shock of the vehicle.

I inclose my cones, cups, and levers with a cap S, and I employ any ordinary dust-shield and, when desired, lubricating arrangements in connection with my improved bearings similar to those now in use with ordinary bearings and axle-boxes, and I make my casing from cast or wrought metal to suit any particular type of axle-box to which my improved fittings are to be applied.

I do not limit the application of my invention to any special arrangement of ball-races or to any special form of levers or brackets, but I modify the same to suit any particular requirement.

Having now described my invention, what I claim as new, and desire to secure by Letters Patent, is—

1. In a ball-bearing, the combination with the cups, of the slidable cones, and means for causing the weight of the load to exert pressure laterally upon said cones, substantially as described.

2. In combination with the wheel and axle, the cups, the cones splined upon the axle and the two-armed lever pivoted upon a fixed support and having one end adapted to receive the weight of the load and transmit said weight through the other arm laterally against the cones, substantially as described.

3. In combination with the wheel, the cups therein, the axle, the cones splined thereon, the two-armed lever adapted to receive vertical pressure from the load and transmit it laterally to the movable cones, and a shock-resisting pad interposed between said lever and cone, substantially as described.

4. In combination with a wheel, cups therein, the axle, the cones splined thereon, the two-armed lever adapted to receive vertical pressure from the load and transmit it laterally to the cones and the thrust-plate and buffer interposed between the lever and cones, substantially as described.

In witness whereof I have hereunto set my hand in presence of two witnesses.

WM. ROSE SMITH.

Witnesses:
WILLIAM EDWARD EVANS,
ALBERT EDWARD PARKER.